(12) United States Patent
Nakajima et al.

(10) Patent No.: US 6,430,039 B2
(45) Date of Patent: *Aug. 6, 2002

(54) PORTABLE INFORMATION APPARATUS HAVING A DISPLAY UNIT COMPRISING A HOUSING AND A DISPLAY CONTAINED IN THE HOUSING

(75) Inventors: Yuji Nakajima; Hiroaki Itakura, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/764,374

(22) Filed: Jan. 19, 2001

Related U.S. Application Data (63) Continuation of application No. 08/950,759, filed on Oct. 15, 1997, now Pat. No. 6,212,067.

(30) Foreign Application Priority Data

Oct. 21, 1996 (JP) .............................................. 8-278189

(51) Int. Cl.[7] .............................. G06F 1/16; H05K 5/00
(52) U.S. Cl. .......................... 361/681; 349/58; 248/917
(58) Field of Search ................................. 361/680, 681, 361/683; 348/794; 349/58, 65; 248/917, 918, 919–923

(56) References Cited

U.S. PATENT DOCUMENTS

| | | | |
|---|---|---|---|
| 5,168,429 A | | 12/1992 | Hosoi .......................... 361/395 |
| 5,379,182 A | | 1/1995 | Fujimori et al. ............. 361/681 |
| 5,568,357 A | * | 10/1996 | Kochis et al. ............... 361/681 |
| 5,623,392 A | * | 4/1997 | Ma .............................. 361/681 |
| 5,699,131 A | * | 12/1997 | Aoki et al. .................. 348/832 |
| 5,703,665 A | * | 12/1997 | Muramatsu et al. ........... 349/60 |
| 5,844,774 A | | 12/1998 | Gushiken et al. ............ 361/681 |
| 6,212,067 B1 | * | 4/2001 | Nakajima et al. ............ 361/681 |

* cited by examiner

*Primary Examiner*—Lynn D. Feild
(74) *Attorney, Agent, or Firm*—Finnegan, Henderson, Farabow, Garrett & Dunner, L.L.P.

(57) ABSTRACT

A portable information apparatus comprising a main body and a display unit rotatably supported by the main body. The display unit comprises a display device and a display housing made of synthetic resin. The display device has a screen. The display housing contains the display device and has first and second side portions spaced apart in a widthwise direction. A pair of support members made of metal are secured to an inner surface of the display housing. Both support members extend along the first and second side portions of the display housing, respectively, supporting the display device at the first and second side portions of the display housing.

8 Claims, 12 Drawing Sheets

PORTABLE INFORMATION APPARATUS HAVING A DISPLAY UNIT COMPRISING A HOUSING AND A DISPLAY CONTAINED IN THE HOUSING

This is a continuation of application Ser. No. 08/950,759, filed Oct. 15, 1997, now U.S. Pat. No. 6,212,067, which is incorporated herein by reference.

BACKGROUND OF THE INVENTION

The present invention relates to a portable information apparatus such as a portable computer, and more particularly to a structure for securing a display device in a housing made of synthetic resin.

A portable computer comprises a main body and a display unit. The main body has a keyboard. The display unit comprises a liquid crystal display (LCD) and a display housing. The LCD has a screen. The display housing is made of synthetic resin and contains the LCD. The housing is connected to the main body by a hinge device. It can be rotated to a closed position where it covers the keyboard from above and to an opened position where it exposes the keyboard.

The display housing is a flat rectangular box. It comprises a rectangular bottom wall and four side walls. The side walls stand from the four edges of the bottom wall, respectively. The bottom wall is slightly larger than the LCD and has four bosses at the four corners. Each boss has a screw hole. The LCD has through holes in its peripheral edge. The LCD is fitted in the display housing, with the holes axially aligned with the screw holes of the bosses. Screws pass through the holes into the screw holes, thus fastening the LCD to the bottom wall of the display housing.

Recently it is demanded in the market that portable computers be as small and light as possible. To meet the demand, the wall thickness of the main body and display housing thinner is reduced. It is strongly demanded that the LCD have a larger screen so that the user may see data more clearly. To fulfill this demand, the LCD is made as large as possible, provided that it can be fitted in the display housing. This means that the LCD occupies almost all space in the display housing.

Here arises a problem. As mentioned above, the display housing is made of synthetic resin, and its bottom wall is thin to render the portable computer as small and light as possible. The bottom wall of the housing is inevitably not rigid, and may be deformed, bending or warping, as the housing is rotated from the closed position to the opened position, or vice versa.

Insufficiently rigid, the bottom wall of the display housing may be deformed when the user rotates the housing by an angle to a specific position so that he or she may see the data clearly. If this happens, the bottom wall will exert a force on the LCD. Consequently, color shading will occur on the LCD screen or a stripe pattern will appear thereon.

BRIEF SUMMARY OF THE INVENTION

The object of the present invention is to provide a portable information apparatus having a display unit comprising a display housing and a display device contained in the display housing, wherein the display housing has a relatively small wall thickness but is rigid enough to hold the display device firmly and not to deformed when the display unit is rotated to any position.

According to a first aspect of the invention, there is provided a portable information apparatus comprising: a main body; a display unit rotatably supported by the main body and comprising a display device and a display housing, the display device having a screen, and the display housing containing the display device and having first and second side portions; and a pair of support members made of metal, secured to an inner surface of the display housing, extending along the first and second side portions of the display housing, respectively, and supporting the display device at the first and second side portions of the display housing.

According to a second aspect of this invention, there is provided a portable information apparatus comprising: a main body; a pair of hinge devices; a display unit rotatably coupled to the main body by the hinge devices and comprising a display device and a display housing, the display device having a screen, and the display housing containing the display device and having first and second side portions spaced apart in a widthwise direction, a third side portion extending between one end of the first side portion and one end of the second side portion, and a fourth side portion extending between the other end of the first side portion and the other end of the second side portion; and a pair of support members made of metal, secured to an inner surface of the display housing, extending along at least the first and second side portions of the display housing, respectively, and supporting the display device at the display housing.

The support members made of metal extend along the first and second side portions of the display housing, and reinforce the display housing from within. The display housing is therefore sufficiently rigid and would not be deformed when the display unit is rotated.

Made of metal and interposed between the display device and the display housing, the support members hold the display device firmly and steadily. The load applied on the display housing is smaller than in the case where the display device is coupled directly to the display housing. No excessive force is exerted on the display device when the display unit is rotated. No color shading will occur on the display screen. Nor will a stripe pattern appear on the display screen.

According to a third aspect of this invention, there is provided a portable information apparatus comprising: a main body; a display unit comprising a display device and a display housing, the display device having a screen, and the display housing containing the display device and having first and second side portions spaced apart in a widthwise direction; and a hinge device coupling the display unit rotatably to the main body, the hinge device comprising a first bracket secured to the main body, a second bracket secured to the display housing, a hinge shaft extending between the first and second brackets, and the second bracket has an extension extending toward the first or second side portion of the display housing and securing the display device to the display housing.

In this apparatus, the second bracket reinforces both the first and second side portions of the display housing, from within. The display housing is therefore sufficiently rigid. It would not be deformed when the display unit is rotated.

Interposed between the display device and the display housing, the extension extending from the second bracket holds the display device firmly and steadily. The load applied to the display housing is smaller than in the case where the display device is coupled directly to the display housing. No excessive force is exerted on the display device when the display unit is rotated. No color shading will occur on the display screen. Nor will a stripe pattern appear on the display screen.

According to a fourth aspect of the invention, there is provided a portable information apparatus comprising: a main body; a hinge device; a display unit rotatably coupled to the main body by the hinge device and comprising a display device and a display housing, the display device having a screen, and the display housing containing the display device and having first and second side portions and to which the display device is secured; and a pair of reinforcing members made of metal, secured to an inner surface of the display housing, extending along the first and second side portions of the display housing, respectively.

In this apparatus, the reinforcing members made of metal reinforce both the first and second side portions of the display housing, from within. The display housing is therefore sufficiently rigid. The display housing would not be deformed when the display unit is rotated.

Secured to the first and second side portions of the display housing, thus reinforced, is the display device. The display device is therefore held firmly and steadily. No excessive force is exerted on the display housing when the display unit is rotated. No color shading will occur on the display screen. Nor will a stripe pattern appear on the display screen.

According to a fifth aspect of the present invention, there is provided a portable information apparatus comprising: a main body; a display unit rotatably coupled to the main body and comprising a display device and a display housing, the display device having a screen, and the display housing containing the display device and having first and second side portions spaced apart in a widthwise direction, a third side portion extending between one end of the first side portion and one end of the second side portion, and a fourth side extending between the other end of the first side portion and the other end of the second side portion; and a support member made of metal, secured to an inner surface of the display housing, and comprising a pair of vertical members extending along the first and second side portions of the display housing, respectively, and a pair of horizontal members extending along the third and fourth side portions of the display housing, respectively, and supporting the display device at the display housing.

In this apparatus, the support member made of metal reinforce the four side portions of the display housing, from within. The display housing is therefore sufficiently rigid. The display housing would not be deformed when the display unit is rotated.

Interposed between the display device and the display housing, the support member holds the display device firmly and steadily. The load applied to the display housing is smaller than in the case where the display device is coupled directly to the display housing. No excessive force is exerted on the display device when the display unit is rotated. No color shading will occur on the display screen. Nor will a stripe pattern appear on the display screen.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

A portable computer which is the first embodiment of the present invention will be described, with reference to FIGS. 1 to 10C.

Figure 1:
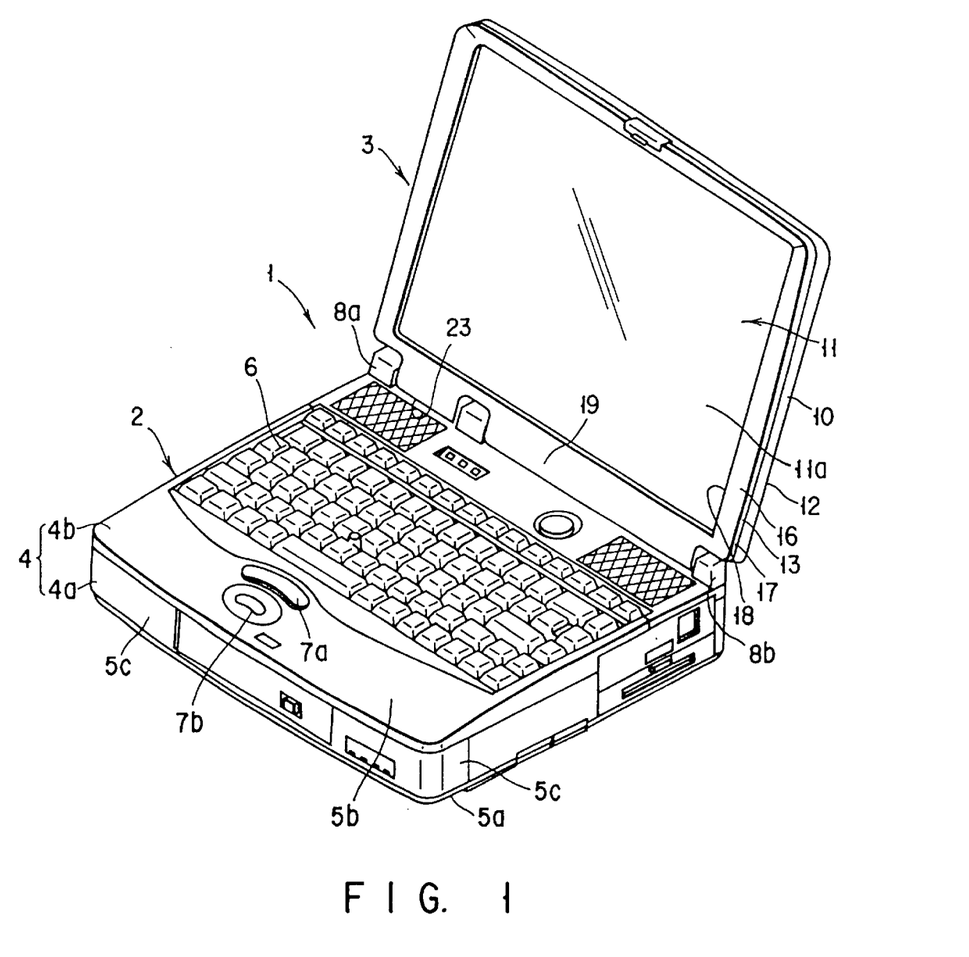
FIG. 1 is a perspective view of a portable computer which is a first embodiment of the invention.

FIG. 1 is a perspective view of the portable computer 1 which is an A4-size, book-type computer. The computer 1 comprises a main body 2 and a display unit 3. The display unit 3 is connected to the main body 2.

The main body 2 has a housing 4 made of synthetic resin. The housing 4 is a flat rectangular box; it is composed of a rectangular bottom wall 5a, a rectangular top wall 5b and four side walls 5c. The bottom wall 5a and the top wall 5b are parallel to each other, opposing each other. The side walls 5c extend from the four edges of the bottom wall 5a to the four edges of the top wall 5b, respectively. Circuit boards, a hard disk drive, and the like are provided in the housing 4.

The housing 4 is divided into a lower housing 4a and an upper housing 4b. The lower housing 4a has the above-mentioned bottom wall 5a, while the upper housing 4b has the above-mentioned top wall 5b. A keyboard 6 and a pair of click-switch buttons 7a and 7b are mounted on the top wall 5b.

Two projections 8a and 8b protrude upwards from the rear end of the top wall 5b. The projections 8a and 8b are spaced apart in the widthwise direction of the housing 4. They have a side wall 23a each, as seen from FIG. 8 which shows the projection 8a only. The side walls 23a of the projections 8a and 8b oppose each other and are formed integral with the top wall 5b of the housing 4. The side walls 23a have a through hole 23b each. The top wall 5b and the side walls 23a constitute a display support 23, which is the rear part of the housing 4.

Figure 2:
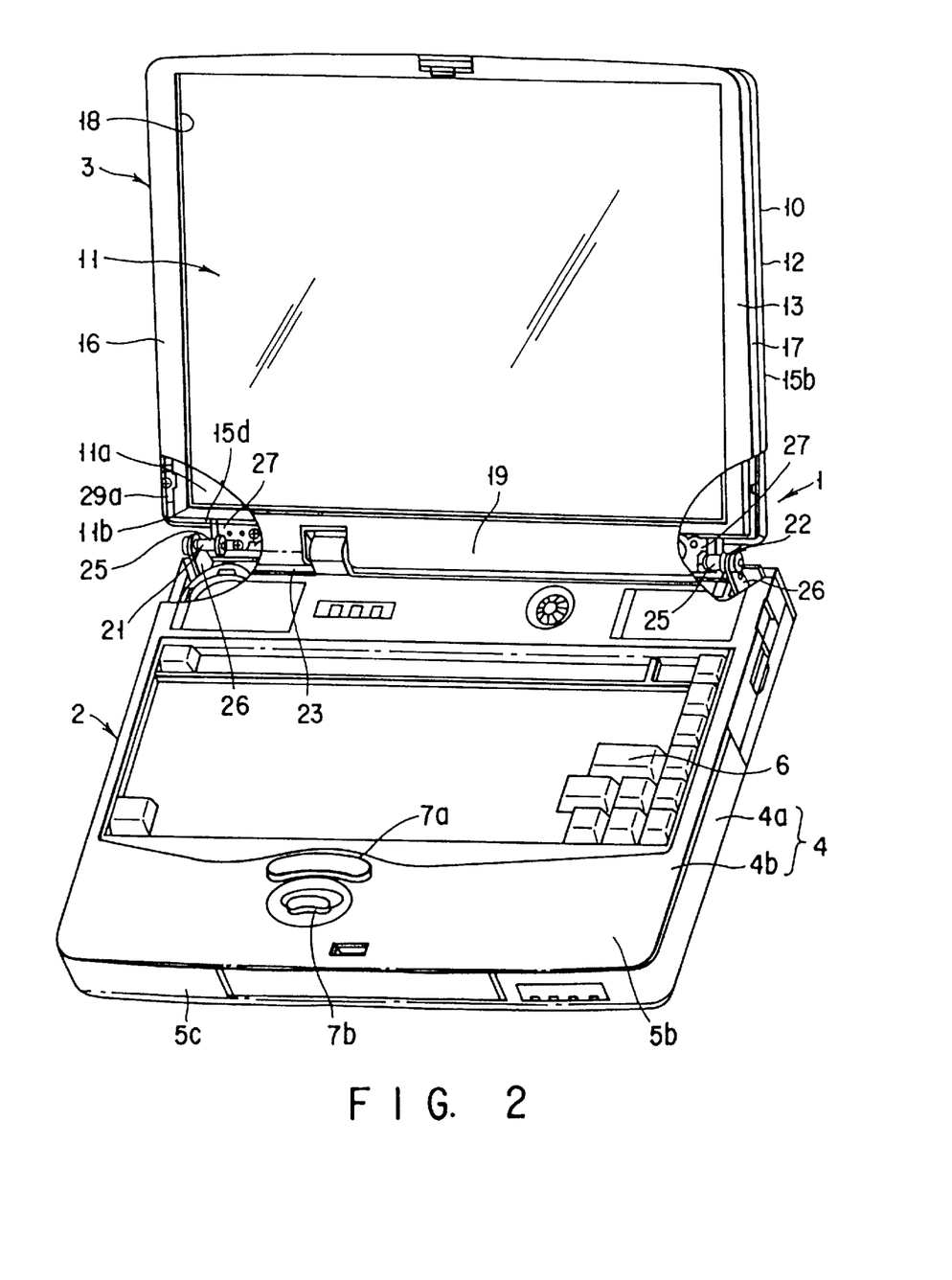
FIG. 2 is a perspective view, showing the internal structure coupling the main body and the display unit of the portable computer.

As seen from FIG. 2, the display unit 3 comprises a display housing 10 and a liquid crystal display (LCD) 11 provided in the housing 10. The display housing 10 is made of synthetic resin. The LCD 11 is composed of a display panel 11a and a frame 11b. The panel 11a has a rectangular screen. The frame 11b surrounds and holds the panel 11a. The display housing 10 is composed of a display cover 12 and a display mask 13 coupled to the cover 12. The housing 10 is shaped like a flat box.

Figure 3A:
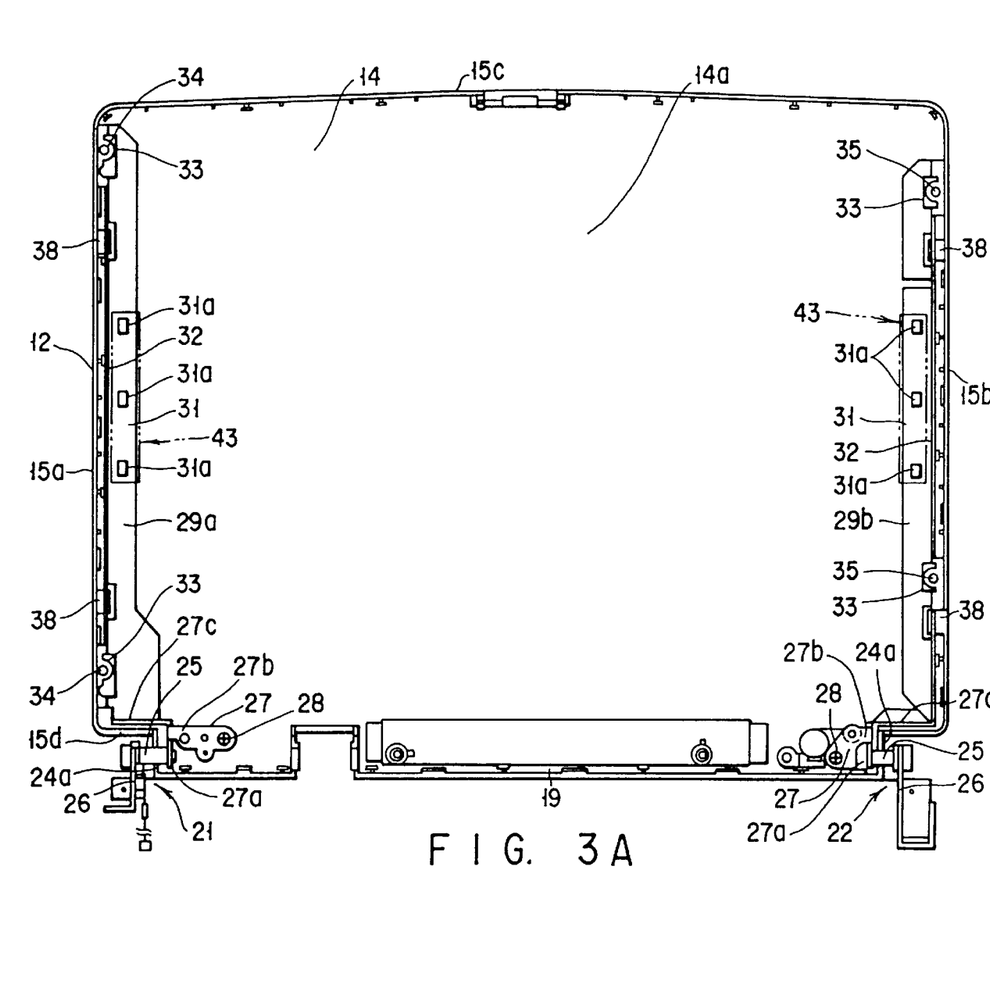
FIG. 3A is a plan view of the display cover of the computer, showing the hinge device and the LCD support.
Figure 3B:
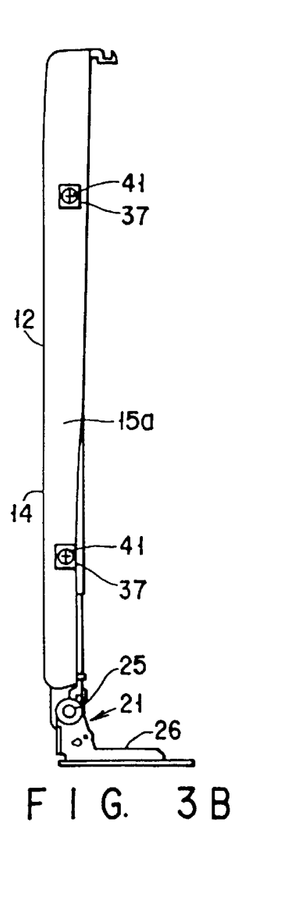
FIG. 3B is a side view of the display cover, showing the hinge device connected to the cover.
Figure 10A:
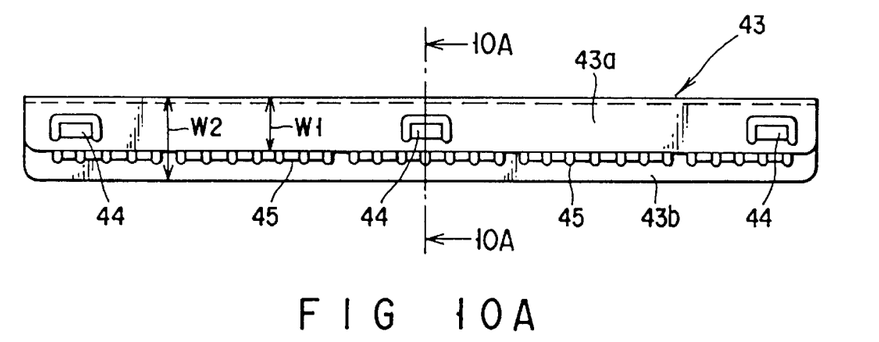
FIG. 10A is a plan view of one of the grounding leaf-springs provided in the first embodiment.
Figure 10B:
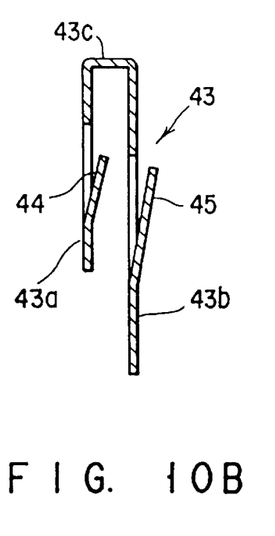
FIG. 10B is a sectional view taken along line 10A—10A in FIG. 10A.
Figure 10C:
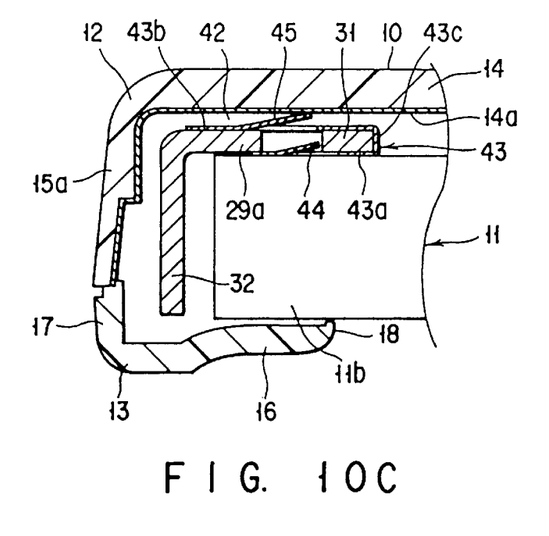
FIG. 10C is a sectional view showing the spring member fastened to the LCD support.

As FIG. 3A shows, the display cover 12 has a bottom wall 14 and four side walls 15a to 15d. The bottom wall 14 is a flat rectangular plate and as large as the top wall 5b of the above-mentioned housing 4. The side walls 15a to 15d extend upwards from the four edges of the bottom wall 14, at substantially right angles thereto. The first and second side walls 15a and 15b are spaced apart in the widthwise direction of the display housing 10. The third side wall 15c extends between one end of the first side wall 15a and one end of the second side wall 15b. The fourth side wall 15d extends between the other end of the first side wall 15a and the other end of the second side wall 15b. The side walls 15c and 15d extend in the widthwise direction of the display housing 10. As shown in FIG. 10C, the inner surfaces of the bottom wall 14 and the side walls 15a to 15d are covered with a conductive layer 14a such as a plated layer. The conductive layer 14a is a shield against the noise generated by the LCD 11.

The display mask 13 has a front wall 16 and side walls 17 connected to the front wall 16. The front wall 16 opposes the bottom wall 14 of the display cover 12. The wall 16 has a rectangular opening 18 which is slightly smaller than the wall 16. The side walls 17 are connected to the side walls 15a to 15d of the display cover 12.

The display housing 10 has a hollow support 19. The support 19 is provided on the fourth side wall 15d and extends in the widthwise direction of the display housing 10. The support 19 rests on the display support 23, interposed between the projections 8a and 8b. The support 19 has a pair of side walls 24a, which oppose the side walls 23a of the projections 8a and 8b, respectively. The side walls 24a have a through hole 24b each. The holes 24b of the walls 24a are coaxial with the through holes 23b of the side walls 23a of the projections 8a and 8b.

The display housing 10 is rotatably coupled to the housing 4 by two hinge devices 21 and 22. Both hinge devices 21 and 22 are made of metal and spaced from each other in the widthwise direction of the housing 4.

As shown in FIGS. 3A, 4A, 6 and 8, the first hinge device 21 connects the left end of the support 19 of the display housing 10 to the left end of the housing 4. The device 21 comprises two brackets 26 and 27 and a hinge shaft 25. The hinge shaft 25 horizontally extends through the through holes 23b and 24b. The shaft 25 has its first and second end portions inserted in the projection 8a and the support 19, respectively. The first bracket 26 is rotatably mounted on the first end portion of the hinge shaft 25. The first bracket 26 is located within the housing 4 and fastened thereto by screws not shown. The second bracket 27 is fixed to the second end portion of the shaft 25 and located within the support 19.

Figure 8:
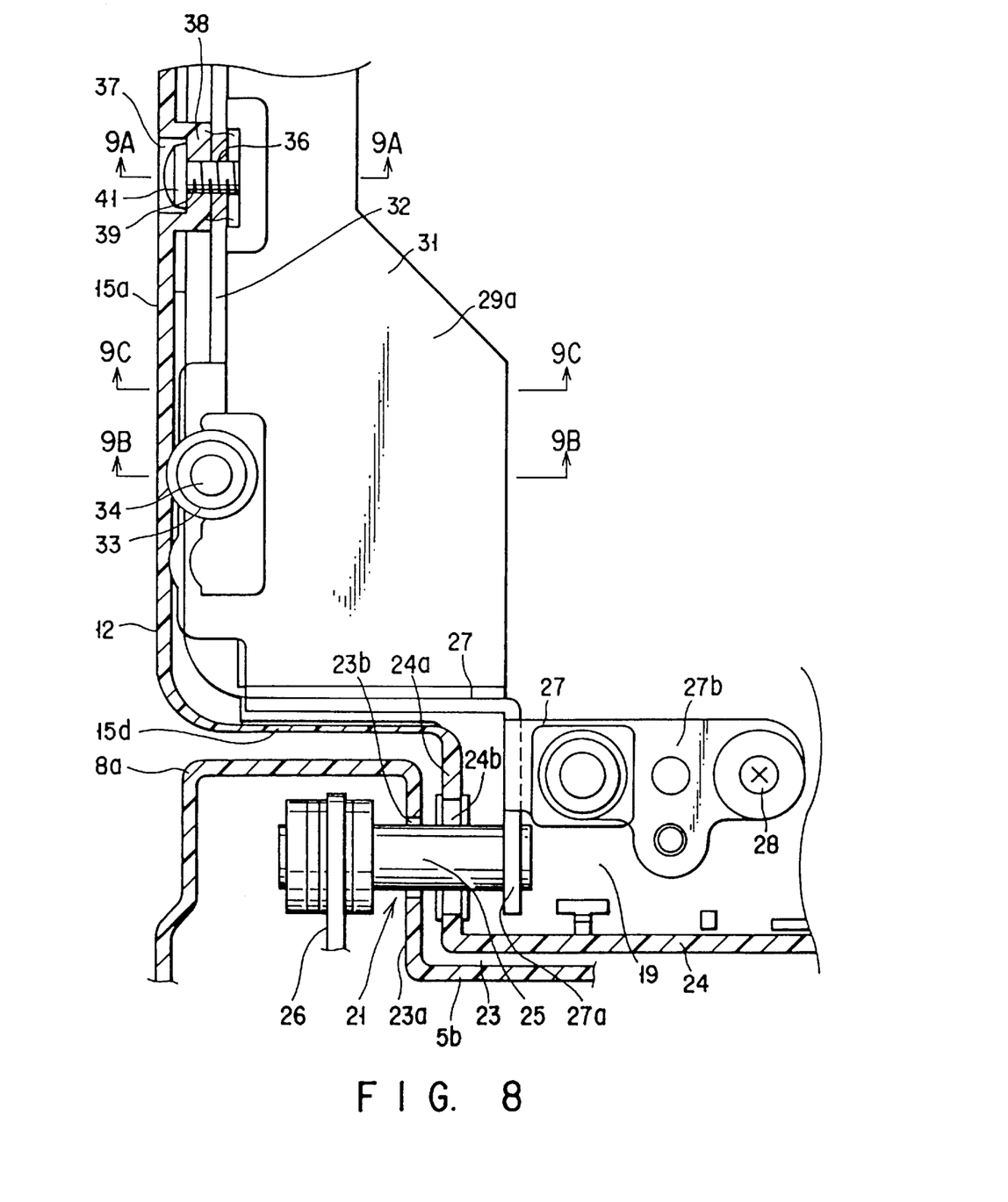
FIG. 8 is a sectional view for explaining how the display unit is coupled to the main body at the left leg of the display housing, in the first embodiment of the invention.

The second bracket 27 of the first hinge device 21 comprises three plates 27a to 27c which are formed integral. The first plate 27a is fastened to the second end portion of the shaft 25 and extends parallel to the side walls 24a. The second plate 27b is connected to the first plate 27a and opposes the bottom wall 14 of the display cover 12. The plate 27b is fastened to the bottom wall 14 by a screw 28. The third plate 27c is connected to the first plate 27a and extends along the fourth side wall 15d of the display cover 12 of the display housing 10. That is, the third plate 27c extends in the widthwise direction of the display housing 10.

Figure 4A:
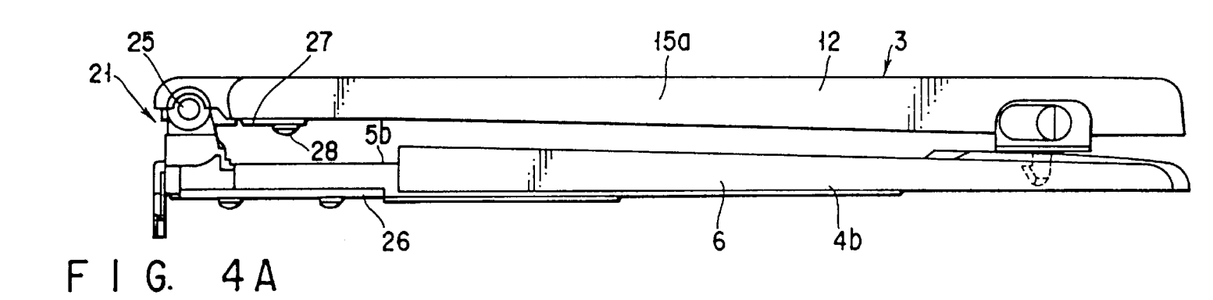
FIG. 4A is a right side view of the display cover and upper housing which are coupled together by the hinge device.
Figure 4B:
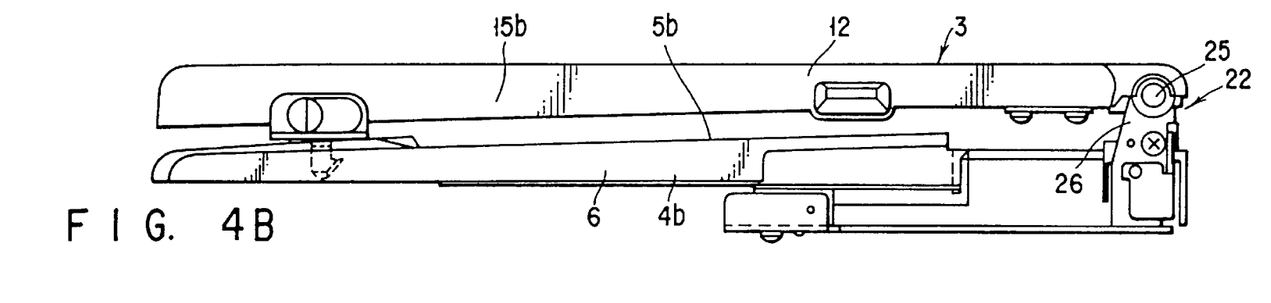
FIG. 4B is a left side view of the display cover and upper housing which are coupled together by the hinge device.
Figure 5:
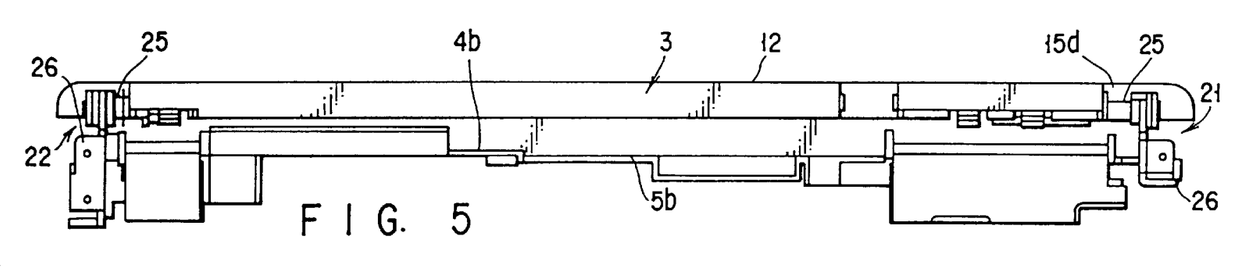
FIG. 5 is a rear view of the display cover and upper housing which are coupled together by the hinge device.
Figure 6:
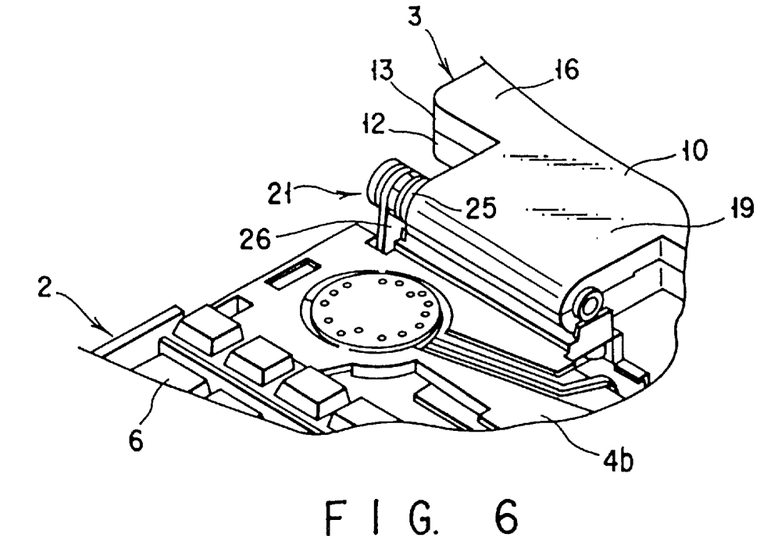
FIG. 6 is a perspective view showing the rear-left corner of the main body and the left leg of the display housing, which are connected by the hinge device.
Figure 7:
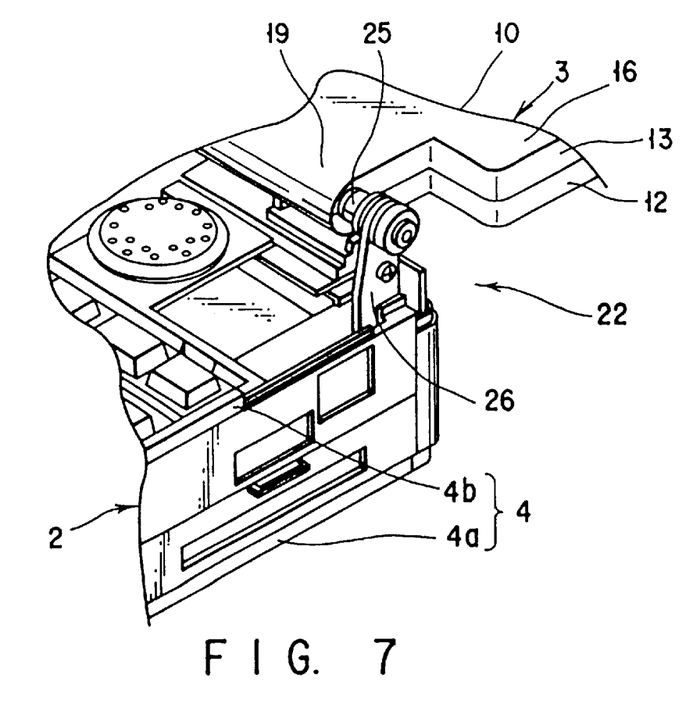
FIG. 7 is a perspective view showing the rear-right corner of the main body and the right leg of the display housing, which are connected by the hinge device.

As FIGS. 3A, 4B and 7 show, the second hinge device 22 connects the right end of the housing 4 to the right end of the support 19 of the display housing 10. The device 22 is identical to the first hinge device 21 in terms of basic structure. The same components as those of the first hinge device 21 are designated at the same reference numerals in the drawing and will not be described in detail.

As illustrated in FIG. 3A, the second bracket 27 of the first hinge device 21 is reinforced by an LCD support 29a, and the second bracket 27 of the second hinge device 22 is reinforced by an LCD support 29b. The LCD supports 29a and 29b are connected to the third plate 27c. Both LCD supports 29a and 29b are parallel to the bottom wall 14 of the display cover 12. In other words, they extend along the bottom wall 14. The LCD support 29a is an elongate strip, extending along the first side wall 15a of the display cover 12. The LCD support 29b is an elongate strip, too, extending along the second side wall 15b of the display cover 12. The LCD supports 29a and 29b are almost as long as the first and second side walls 15a and 15b, respectively. In the display housing 14, the LCD supports 29a and 29b extend in the depthwise direction of the housing 14 and are located symmetrically at the left and right sides, respectively.

Figure 9A:
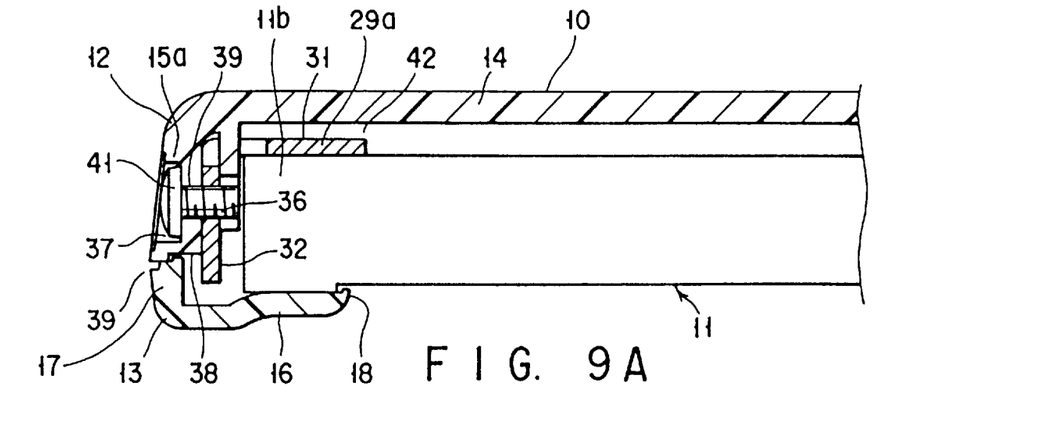
FIG. 9A is a sectional view taken along line 9A—9A in FIG. 8.

As shown in FIGS. 8 and 9A, the first LCD support 29a is composed of two parts 31 and 32, and so is the second LCD support 29b. The first part 31 has three holes 31a, which are spaced apart in the lengthwise direction of the LCD supports 29a and 29b. The first part 31 opposes the bottom wall 14 of the display cover 12, and the second part 32 opposes the first and second side walls 15a and 15b of the display cover 12. Hence, the LCD supports 29a and 29b have an L-shaped cross section and are, therefore rigid.

As FIGS. 3A and 8 show, the LCD supports 29a and 29b have two seats 33 each. The seats 33 are set apart in the lengthwise direction of the first part 31. As seen from FIG. 9B, the seats 33 are located farther than the first part 31 from the bottom wall 14. The seats 33 have a through hole 34 each. The display cover 12 has a plurality of bosses 35. The bosses 35 are provided in the corner defined by the bottom wall 14 and side walls 15a and 15b of the display cover 12. Each boss 35 has a distal surface 35a exposed to the interior of the display cover 12. A screw hole 35b is made in the distal surface 35a. The bosses 35 are aligned with the seats 33 of the LCD supports 29a and 29b, and the screw holes 35b of the bosses 35 are aligned with the through holes 34 of the seats 33.

As shown in FIGS. 8 and 9A, the second parts 32 of the LCD supports 29a and 29b have two screw holes 36 each.

The screw holes 36 are located near the seats 33. The walls 15a and 15b of the display cover 12 have two seats 38 each. These seats 38 project inwards from the side walls 15a and 15b. The distal ends of the seats 38 abut on the second parts 32 of the LCD supports 29a and 29b. Each seat 38 has a through hole 39, which extends through the side wall (15a or 15b) and opens to the outside of the display cover 12. The side walls 15a and 15b have two recesses 37 each, in their outer surfaces. The recesses 37 are aligned with the seats 38. A through hole 39 is made in the bottom of each recess 37. Screws 41 pass through the holes 39 and are set in engagement with the screw holes 35b of the bosses 35. The hinge brackets 26 and 27 are thereby fastened to the side walls 15a and 15b of the display cover 12. The heads of the screws 41 are placed in the recesses 37 of the side walls 15a and 15b.

Figure 9B:
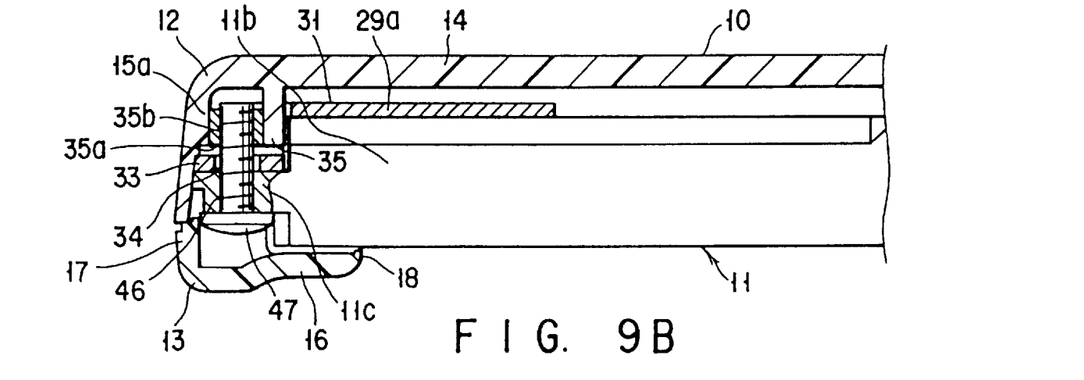
FIG. 9B is a sectional view taken along line 9B—9B in FIG. 8.
Figure 9C:
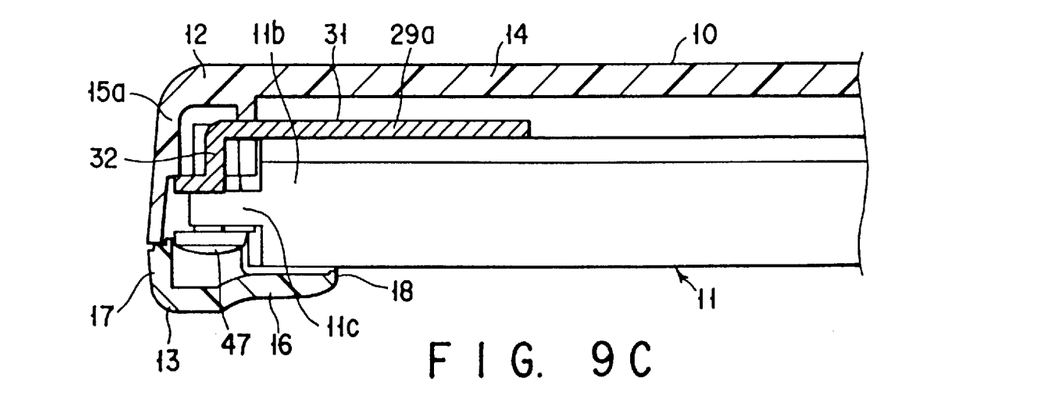
FIG. 9C is a sectional view taken along line 9C—9C in FIG. 8.

As shown in FIG. 9B, the frame 11b of the LCD 11 faces the first to third side walls 15a to 15c of the display cover 12. The frame 11b has a plurality of support strips 11c. Some of the support strips 11c extend toward the first side wall 15a, and the remaining support strips 11c toward the second side wall 15b. The projections 11c have one through hole 46 each. They overlap the seats 33 of the LCD supports 29a and 29b, with the through holes 46 axially aligned with the through holes 34 of the seats 33. Screws 47 pass through the holes 46 and the holes 34 and driven into the screw holes 35b of the bosses 35. The LCD frame 11b is thereby pressed onto the first parts 31 of the LCD supports 29a and 29b. As a result, the LCD 11 is fastened to the display cover 12, with the first parts 31 interposed between the LCD 11 and the cover 12.

The display mask 13 is connected to the display cover 12, securing the LCD 11 to the display cover 12. The mask 13 covers the frame 11b, the screws 47 and the frame 11b. The screen of the display panel 11a is exposed through the rectangular opening 18 of the display mask 13. The screen is therefore be seen from outside the display housing 10.

As shown in FIG. 3A, two grounding leaf springs 43 are attached to the first parts 31 of the LCD supports 29a and 29b, respectively. The springs 43 are made of metal which is electrically conductive. As FIG. 10B shows, each grounding leaf spring 43 is composed of two contact plates 43a and 43b and a connecting plate 43c. The plate 43c connects the contact plates 43a and 43b. Both contact plates 43a and 43b extend parallel to each other, in the lengthwise direction of the LCD supports 29a and 29b. As seen from FIG. 10A, the second contact plate 43b has a width W2 greater than the width W1 of the first contact plate 43a.

The first contact plate 43a has three engagement strips 44. The strips 44 are cutouts of the plate 43a, spaced part in the lengthwise direction of the plate 43a. They extend slantwise with respect to the second contact plate 43b and can elastically deform toward the first contact plate 43a. The strips 44 are fitted in the three holes 31a of the LCD supports 29a and 29b.

The second contact plate 43b has a number of elongated contacts 45 which are spaced apart in the lengthwise direction of the second contact plate 43b. The contacts 45 are cutouts of the second contact plate 43b. They extend slantwise, each increasingly spaced from the contact plate 43b toward its distal end, and can elastically deform toward the second contact plate 43b.

As illustrated in FIG. 10C, the second contact plate 43b of either grounding leaf spring 43 is inserted in the gap 42 between the first pate 31 of one LCD support (29a or 29b) and the bottom wall 14 of the display cover 12. The contacts 45 are thereby set, at their distal ends, in contact with the conductive layer 14a provided on the bottom wall 14. The first contact plate 43a is thereby located above the first part 31 of the LCD support. Elastically deformed, the engagement strips 44 of the first contact plate 43a are fit in the holes 31a of the LCD support. Both grounding leaf springs 43 are thereby secured to the LCD supports 29a and 29b, respectively, and electrically connect the LCD supports 29a and 29b to the conductive layer 14a provided on the bottom wall 14.

As described above, the second bracket 27 of the first hinge device 21 has the LCD support 29a, and the second bracket 27 of the second hinge device 22 has the LCD support 29b. The LCD supports 29a and 29b extend along the first and second side walls 15a and 15b of the display cover 12 and are connected to the side walls 15a and 15b and also to the bottom wall 14. The LCD supports 29a and 29b reinforce the display cover 12 from within. The display cover 12 is therefore sufficiently rigid through its wall thickness is relatively small. Hence, the display housing 10 would not be deformed when rotated to the opened position or the closed position.

The frame 11b of the LCD 11 is secured to the bosses 35 provided on the bottom wall 14 of the display cover 12 and overlaps the first parts 31 of the LCD supports 29a and 29b. Namely, the LCD 11 is supported by the LCD supports 29a and 29b. Since both supports 29a and 29b are made of metal and rigid, they receive almost all weight of the LCD 11. Only a small part of the weight of the LCD 11 acts on the bottom wall 14. The LCD 11 is more firmly held than in the conventional portable computer wherein the bottom wall of the display cover supports the LCD. Hence, the LCD is not twisted when the display unit 3 is rotated. No color shading will occur on the LCD panel 11a. Nor will a stripe pattern appear on the LCD panel 11a.

As indicated above, the LCD supports 29a and 29b extend along the first and second side walls 15a and 15b of the display cover 12. This means that the outer edges of the LCD 11 are very close to the side walls 15a and 15b, forming almost no space between the outer edges of the LCD 11, one the one hand, and the side walls 15a and 15b, on the other. The LCD 11 can therefore be expanded in the widthwise direction of the display housing 10, without enlarging the display housing 10. In other words, the display panel 10a can be larger, providing a larger screen.

Figure 11:
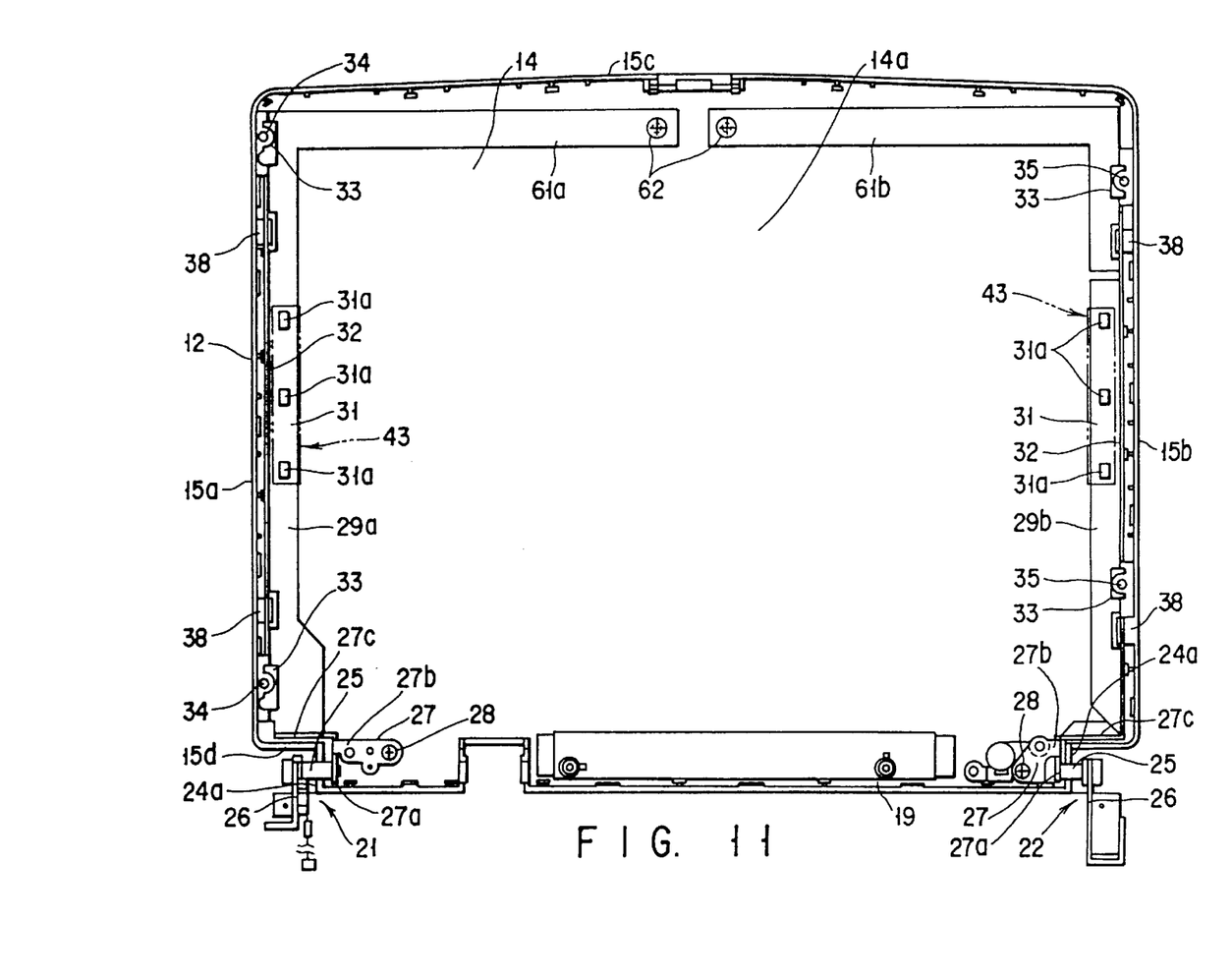
FIG. 11 is a plan view of the display cover of the computer according to a second embodiment of the invention, illustrating the hinge device and the LCD support.

The present invention is not limited to the first embodiment described above. A portable computer according to the second embodiment will be described, with reference to FIG. 11. FIG. 11 is a plan view of the display cover of the portable computer.

The second embodiment is identical in structure to the first embodiment, except for the shape of the LCD supports 29a and 29b. The components identical or similar to those of the display cover of the first embodiment are designated at the same reference numerals in FIG. 11 and will not be described in detail.

As shown in FIG. 11, the LCD supports 29a and 29b have extensions 61a and 61b, respectively. The extensions 61a and 61b are located, with one end located close to the distal ends of the first parts 31 of the LCD supports 29a and 29b. They extend along the third side wall 15c and oppose the bottom wall 14. Their display ends are close to each other and fastened to the bottom wall 14 by screws 62. Both extensions 61a and 61b overlap the frame 11b of the LCD 11.

The extensions 61a and 61b reinforce that part of the bottom wall 14 which is connected to the third side wall 15c. The display cover 12 is therefore more rigid than otherwise. Ultimately, the display housing 10 of the portable computer 1 is more rigid than its counterpart of the first embodiment.

Having the extensions 61a and 61b extending in the widthwise direction of the display housing 10, the LCD supports 29a and 29b hold the LCD 11 more firmly than their counterparts of the first embodiment. Thus, the supports 29a and 29b serve to secure the LCD 11 to the display cover 12 more steadily.

A portable computer which is the third embodiment of this invention will be described, with reference to FIGS. 12 and 13.

Figure 12:
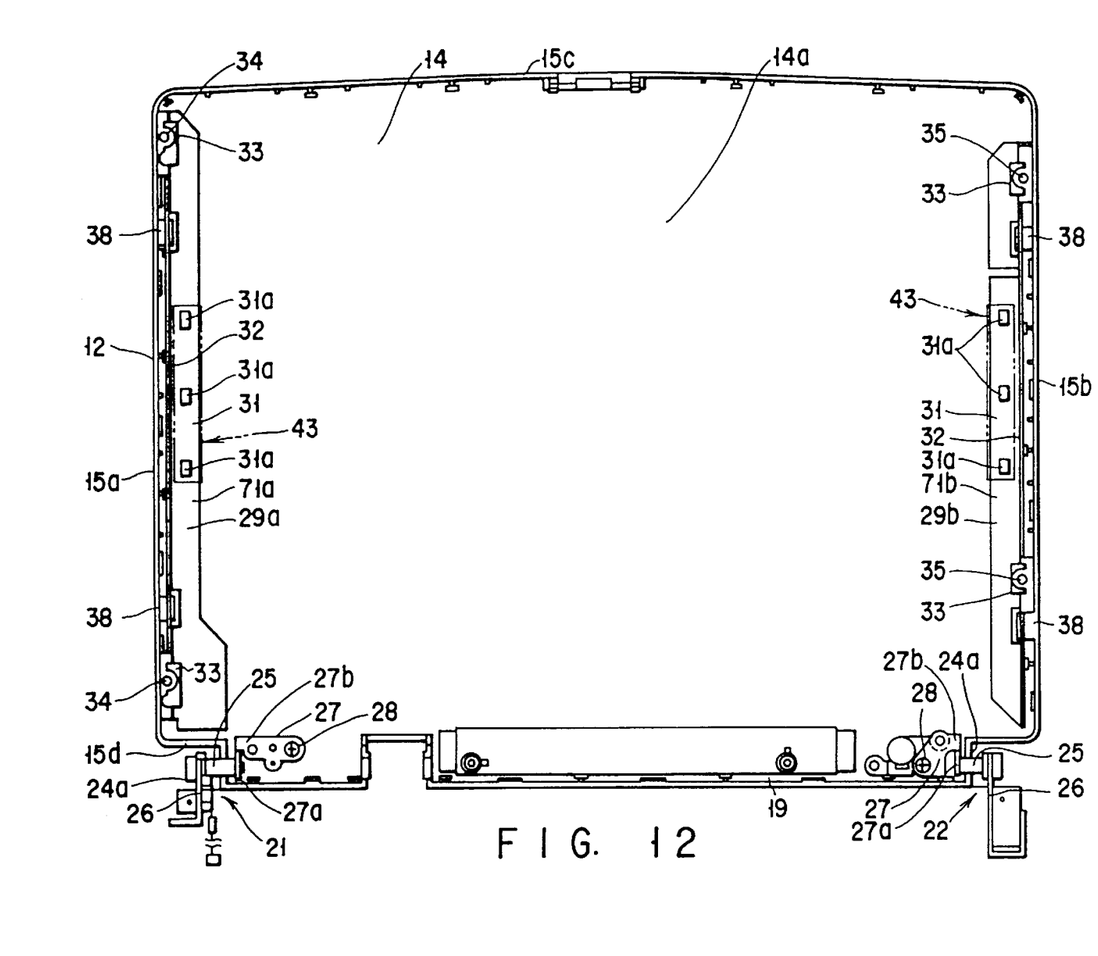
FIG. 12 is a plan view of the display cover of the computer according to a third embodiment of the invention, illustrating the hinge device and the LCD support.
Figure 13:
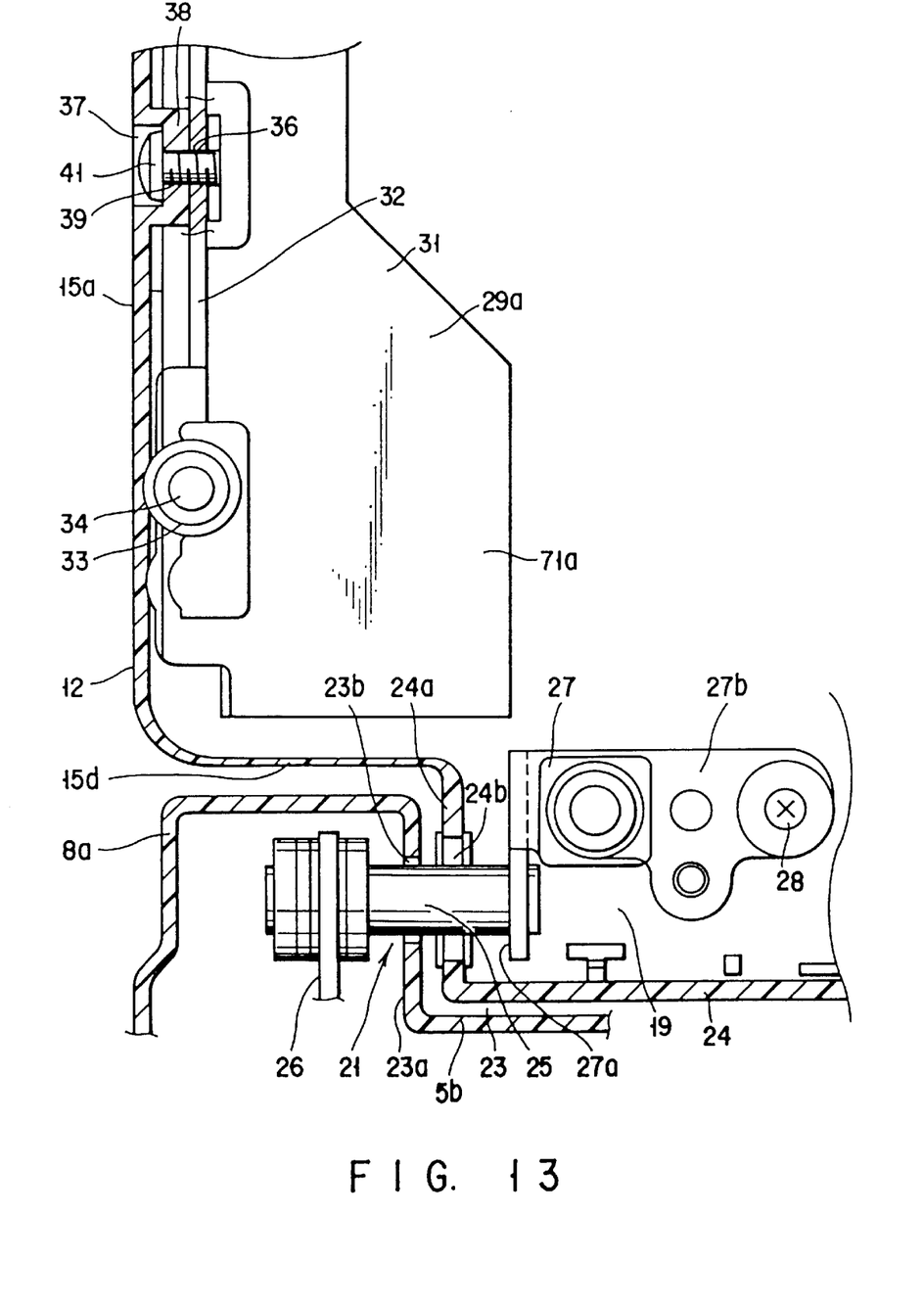
FIG. 13 is a sectional view for explaining how the display unit is coupled to the main body at the left leg of the display housing, in the third embodiment of the invention.

FIG. 12 is a plan view of the display cover 12 of the third embodiment. FIG. 13 is a sectional view explaining how the display unit 3 is coupled to the main body 2 at the left leg of the display housing 10. As seen from FIGS. 12 and 13, the LCD supports 29a and 29b are made of metal pates 71a and 71b which have been cut from the second hinge bracket 27. Except for this feature the display cover 12 is identical to its counterpart of the first embodiment.

Also in the third embodiment, the LCD 11 can be expanded in the widthwise direction of the display housing 10, without enlarging the display housing 10. Hence, the display housing 10 would not be deformed when rotated to the opened position or the closed position.

Figure 14:
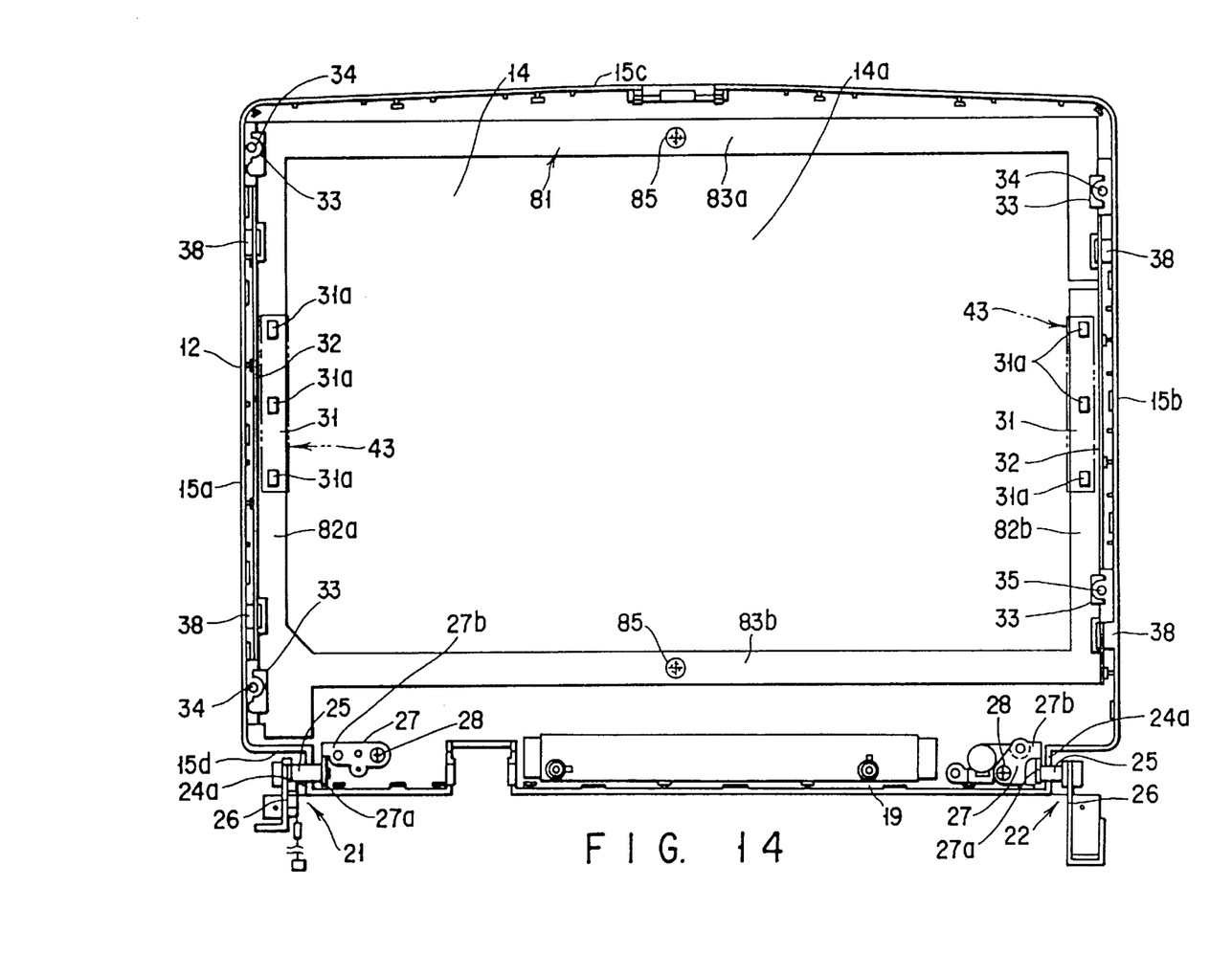
FIG. 14 is a plan view of the display cover of the computer according to a fourth embodiment of the invention, illustrating the hinge device and the LCD support.

A portable computer which is the fourth embodiment of the present invention will be described, with reference to FIG. 14. FIG. 14 shows the display cover 12 of the fourth embodiment. The fourth embodiment is identical to the first embodiment, except for the structure which reinforces the display cover 12.

As shown in FIG. 14, an LCD support 81 made of metal is provided on the bottom wall 14 of the display cover 12. The LCD support 81 is composed of two vertical members 82a and 82b and two horizontal members 83a and 83b. The members 82a, 82b, 83a and 83c are connected together, forming an integral component. The vertical members 82a and 82b extend along the first and second side walls 15a and 15b of the display cover 12, respectively. These members 82a and 82b are identical in structure to the LCD supports 29a and 29b provided in the first to third embodiments.

The horizontal members 83a and 83b are provided between the vertical members 82a and 82b. The first horizontal member 83a extends along the third side wall 15c of the display cover 12 and faces the bottom wall 14. The second horizontal member 83b extends along the support 19 and faces the bottom wall 14 of the display cover 12. The horizontal members 83a and 83b are secured at their middle portions to the bottom wall 14 by means of screws 85. The LCD support 81 is therefore shaped like a frame, surrounding the LCD 11. The frame 11b of the LCD 11 is laid on the LCD support 81.

Since the LCD support 81 surrounds the LCD 11, it reinforces the display cover 12. The display housing 10 is therefore more rigid than otherwise. Moreover, since the LCD support 81 contacts all periphery of the LCD 11, it hold the LCD 11 more steadily.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A portable apparatus comprising:
a main body;
a display unit comprising a liquid crystal display and a display housing, said display housing containing said liquid crystal display and having a side wall;
a hinge device coupling said display unit rotatably to said main body; and
a support member coupled to said hinge device and positioned between said side wall of said display housing and said liquid crystal display,
wherein said side wall of said display housing and said liquid crystal display are fastened through said support member.

2. An apparatus according to claim 1, further comprising:
at least one first screw coupling said support member and said side wall of said display housing; and
at least one second screw coupling said display housing and said liquid crystal display.

3. A portable apparatus comprising:
a main body;
a display unit rotatably supported by said main body and including a liquid crystal display and a display housing, said display housing containing said liquid crystal display and having a side wall; and
a support member provided in said display housing and positioned between said side wall of said display housing and said liquid crystal display,
wherein said side wall of said display housing and said liquid crystal display are fastened through said support member.

4. A portable apparatus comprising:
a main body;
a display unit rotatably supported by said main body and including a liquid crystal display and a display housing containing said liquid crystal display, said display housing including a display cover and a display mask, said display cover having a side wall and a bottom wall continuous from said side wall, and said display mask having an opening exposing said liquid crystal display and coupled to said display cover;
a support member provided in said display housing and positioned between said side wall of the display cover and said liquid crystal display; and
a screw coupling said bottom wall of said display cover, said support member, and said liquid crystal display to one another.

5. A portable apparatus according to claim 4, which further comprises a hinge device coupling said main body and said display unit, allowing said main body and said display unit to rotate with respect to each other, said hinge device comprises a first bracket secured to said main body, a second bracket secured to said display cover, and a hinge shaft extending between the first and second brackets, and said support member is formed integral with said second bracket.

6. A portable apparatus according to claim 4, wherein said screw is screwed into said bottom wall after piercing through said support member and said liquid crystal display.

7. A portable apparatus according to claim 6, wherein said support member is coupled to said side wall of said display cover with another screw.

8. A portable apparatus comprising:
a main body;
a display unit rotatably supported by said main body and including a display housing, said display housing containing a liquid crystal display and having a side wall; and
a support member positioned between said side wall of said display housing and said liquid crystal display and attached to a side of said liquid crystal display.

* * * * *